(12) United States Patent
Bedrosian

(10) Patent No.: US 6,895,189 B1
(45) Date of Patent: May 17, 2005

(54) OPTICAL SYNCHRONIZATION SYSTEM

(75) Inventor: Paul Stephan Bedrosian, Andover, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/175,522

(22) Filed: Oct. 20, 1998

(51) Int. Cl.[7] .............................................. H04B 10/00
(52) U.S. Cl. ..................... 398/155; 398/154; 398/66; 398/70; 398/71; 398/98; 398/100; 370/503; 370/516; 455/502; 455/503; 455/427; 375/354; 375/356; 375/362; 375/352; 375/328
(58) Field of Search ................................ 398/154, 155, 398/66, 70, 71, 98, 100, 67, 165, 161.5, 115, 168, 72, 99; 370/503, 516; 455/502, 503, 427; 375/354, 356, 362, 352, 328

(56) References Cited

U.S. PATENT DOCUMENTS

| | | | | |
|---|---|---|---|---|
| 5,537,093 A | * | 7/1996 | Aunon et al. ................. | 340/531 |
| 5,557,437 A | * | 9/1996 | Sakai et al. .................. | 359/110 |
| 5,654,815 A | * | 8/1997 | Bunse .......................... | 359/158 |
| 5,682,257 A | * | 10/1997 | Uchida ......................... | 359/118 |
| 5,687,015 A | * | 11/1997 | Abe ............................. | 359/161 |
| 5,710,650 A | * | 1/1998 | Dugan ......................... | 359/133 |
| 5,727,034 A | * | 3/1998 | Ojaniemi ..................... | 375/356 |
| 5,790,171 A | * | 8/1998 | Klopfer et al. ................ | 348/6 |
| 5,796,501 A | * | 8/1998 | Sotom et al. ................. | 359/119 |
| 5,896,212 A | * | 4/1999 | Sotom et al. ................. | 359/125 |
| 6,057,949 A | * | 5/2000 | Kinstler ........................ | 359/164 |
| 6,160,816 A | * | 12/2000 | Tanaka et al. ............... | 370/467 |
| 6,256,507 B1 | * | 7/2001 | Lemieux ....................... | 455/502 |
| 6,272,130 B1 | * | 8/2001 | Panahi et al. ................ | 370/366 |
| 6,418,151 B1 | * | 7/2002 | Walter et al. ................. | 370/503 |
| 6,477,154 B1 | * | 11/2002 | Cheong et al. .............. | 370/328 |
| 6,487,262 B1 | * | 11/2002 | Moulton et al. ............. | 375/356 |

* cited by examiner

*Primary Examiner*—Hanh Phan

(57) ABSTRACT

A synchronization system in accordance with the principles of the invention includes a central synchronizing management unit, at least one synchronization distribution unit, and at least one network element. Each synchronization distribution unit receives synchronization and management information from the central synchronization management unit. This information may be transmitted directly from the central synchronization management unit, or it may be transmitted though another synchronization distribution unit in a group of a daisy-chained synchronization distribution units. The daisy-chained arrangement employs both active and passive optical paths. The central synchronizing management unit may query any synchronization distribution unit within the system to obtain performance statistics. Additionally, the central synchronizing management unit may detect faults within the system by setting performance monitoring thresholds and interrogating a synchronization distribution unit to determine whether a threshold has been exceeded. The synchronization distribution units are physically located in close proximity to the network elements they serve. Additionally, the management and synchronization information exchanged between the central synchronization unit and a synchronization distribution unit is carried over a bidirectional optical link.

18 Claims, 4 Drawing Sheets

OPTICAL SYNCHRONIZATION SYSTEM

FIELD OF THE INVENTION

The invention relates to synchronization systems and, more particularly, to synchronization systems for the telephone office environment.

BACKGROUND OF THE INVENTION

Synchronization systems are widely employed within telephone offices, for example, to distribute synchronization signals to various digital circuit elements that employ the synchronization signals in the timing, transmission, reception, and routing of signals. A typical office, such as a telephone central office, includes a central synchronization generator, such as a building integrated timing supply (BITS) clock, which generates and distributes the synchronization, or clock, signals throughout the office to individual network elements within the office. Conventional clock distribution systems often employ DS1 or composite clock timing signals which operate, respectively, at 1.544 Mb/s and 8/64 kb/s. In small offices, this mode of timing distribution is both economical and adequate. In larger offices, offices that employ in the tens of network elements or more, the management and routing of the timing cables can prove to be challenging.

That is, in a conventional centralized distribution system such as this, individual twenty-two gauge twisted wire pair shielded cables carry the desired clock signals between each network element and the BITS clock. Each of these cables is typically limited in length to six hundred and fifty five feet. Such length restrictions may severely limit the size of office that may be served by such a conventional synchronization system, with larger offices requiring the addition of another BITS clock. The additional BITS clock must also be synchronized with the first BITS clock in order to avoid timing loops within the office. Not only is there a significant capital expense associated with the addition of a BITS clock, the increased maintenance costs can also be significant. Additionally, noise and crosstalk electromagnetically induced on the cables can seriously degrade the performance of such a system and the number of taps, or ports for connection with network elements, is limited by the number of ports available at the centralized clock source. Furthermore, since cabling in such facilities is often routed through cabling "troughs", the addition of an network element means more cable must be routed through the troughs. Not only may the addition of cables to these troughs exceed the physical capacity of the troughs, maintenance of cables within the troughs could be severely compromised by the forcing too many cables into a trough. That is, since all the clock distribution cabling is routed to a centralized location, the physical bulk of the cabling may prevent the addition of more cabling and may hinder attempts to maintain the existing cabling.

A synchronization system that is relatively impervious to electromagnetic interference, that is readily capable of distributing clock signals substantially farther than six hundred and fifty five feet, and that provides for modular growth to accompany the expansion of an associated office system is therefore highly desirable.

SUMMARY

A synchronization system in accordance with the principles of the present invention includes a central synchronizing management unit, or clock generator, at least one synchronization distribution unit, and at least one network element. Each synchronization distribution unit receives synchronization and management information from the central synchronization management unit. This information may be transmitted directly between the central synchronization management unit and a synchronization distribution unit, or it may be transmitted between synchronization distribution units through a daisy-chained arrangement with other synchronization distribution units.

In an illustrative embodiment, the synchronization system distributes timing signals throughout a telecommunications office such as a central office, over optical communications links. The central synchronizing management unit provides synchronization monitoring capability and synchronization measurement capability allowing a central synchronizing management unit to query network elements for timing metrics, information regarding phase noise, and the network element's status regarding holdover events, for example.

The series-connected arrangement employs both active and passive optical paths. The active path provides clock signal regeneration and performance monitoring functions, while the passive path is more reliable, that is, the passive path is not susceptible to power failures or other failures that may affect the active path, for example. In an illustrative embodiment, the active and passive paths of a daisy-chained group of synchronization distribution units are cross-coupled. That is, the passive optical output of one synchronization distribution unit is connected to the active optical input of a downstream synchronization distribution unit and the active optical output of the synchronization distribution unit is connected to the passive optical input of the downstream synchronization distribution unit. This cross-coupling permits the system to use a passive link to "loop-around" a failed active link, thereby ensuring the survivability of a portion of the active link while avoiding the cost and decreased reliability of fully redundant active optical links. Additionally, since a synchronization distribution unit would receive synchronization signals from two different upstream synchronization distribution units, the passive link being supplied by the active elements within the immediately preceding synchronization distribution unit and the active link being supplied by the active elements from the preceding synchronization distribution unit preceding that one.

A synchronization system in accordance with the principles of the present invention distributes synchronization signals from a central synchronizing management unit through one or more synchronization distribution units to network elements (network elements) within an office that require external synchronization. In an illustrative embodiment synchronization and management signals are carried over optical links between a central synchronizing management unit and each synchronization distribution unit, and between each synchronization distribution unit and each network element. The distributed architecture of the present invention, an architecture that distributes synchronization and management signals to synchronization distribution units which, in turn distribute signals to network elements, reduces the number of links required for the distribution of these signals. That is, each synchronization distribution unit acts as a concentrator, preferably communicating with a plurality of network elements and thereby limiting the number of direct links to a central synchronization management unit. As a result, the number of cables routed through a given cable trough for communication with a central synchronization management may be considerably less than the number that would be required to directly connect each network element with the central synchronization management unit. In an illustrative embodiment, each synchronization distribution unit is located in relatively close proximity to a plurality of network elements, thus reducing the total length of cable required to serve a given office. Additionally, synchronization and management information is carried over optical links which further reduce the volume occupied by synchronization signaling. The optical links may be implemented as relatively inexpensive multi-mode plastic fibers that, nevertheless, provide substantial immunity to electromagnetic interference and support a relatively large number of network element connections, or "taps". Synchronization distribution units may be connected serially to support an even greater number of network elements.

In an illustrative embodiment, the synchronization distribution units are physically located in close proximity to the network elements they serve. For example, in a multi-floor office a separate synchronization distribution unit may be located on each of the floors to provide synchronization to all the network elements on a given floor. Additionally, the management and synchronization information exchanged between the central synchronization unit and a synchronization distribution unit is carried over a bidirectional optical link. With this arrangement, a synchronization distribution unit in the serial connection of synchronization distribution units may fail without adversely affecting the operation of downstream synchronization units. The central synchronizing management unit may query any synchronization distribution unit within the system to obtain performance statistics. Additionally, the central synchronization management unit may detect faults within the system by setting performance monitoring thresholds and interrogating a synchronization distribution unit to determine whether a performance monitoring threshold has been exceeded.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

A synchronization system in accordance with the principles of the present invention distributes synchronization signals from a central synchronizing management unit through one or more synchronization distribution units to network elements within an office that require external synchronization. In an illustrative embodiment synchronization and management signals are carried over optical links between a central synchronizing management unit and each synchronization distribution unit, and between each synchronization distribution unit and each network element.

The distributed architecture of the present invention, an architecture that distributes synchronization and management signals to synchronization distribution units which, in turn, distribute signals to network elements, reduces the number of links required for the distribution of these signals. That is, each synchronization distribution unit acts as a concentrator, preferably communicating with a plurality of network elements and thereby limiting the number of direct links to a central synchronization management unit. As a result, the number of cables routed through a given cable trough for communication with a central synchronization management unit may be considerably less than the number that would be required to directly connect each network element with the central synchronization management unit. In an illustrative embodiment, each synchronization distribution unit is located in relatively close proximity to a plurality of network elements, thus reducing the total length of cable required to serve a given office. Additionally, synchronization and management information is carried over optical links which further reduce the volume occupied by synchronization signaling. The optical links may be implemented as relatively inexpensive multi-mode plastic fibers that, nevertheless, provide substantial immunity to electromagnetic interference and support a relatively large number of network element connections. Synchronization distribution units may be connected in series to support an even greater number of network elements, hundreds, for example.

Figure 1:
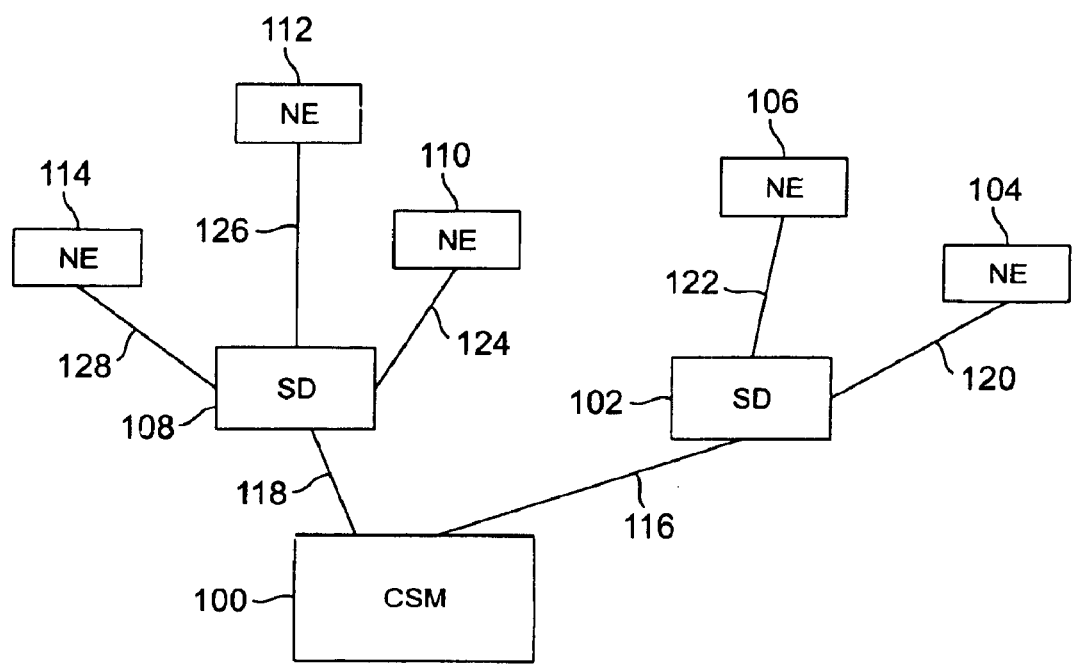
FIG. 1 is a conceptual block diagram of a synchronization distribution system in accordance with the principles of the invention.

A synchronization system in accordance with the principles of the present invention is illustrated in the conceptual block diagram of FIG. 1 which includes a central synchronization management unit 100 a first synchronization distribution unit 102 and network elements 104 and 106. The system also includes a second synchronization distribution unit 108, and network elements 110, 112, and 114. The central synchronization management unit 100 is respectively connected via optical data links 116 and 118 to synchronization distribution unit 102 and synchronization distribution unit 108. network elements 104 and 106 are respectively connected to synchronization distribution unit 102 through optical links 120 and 122. Similarly, network elements 110, 112, and 114 are respectively connected to synchronization distribution unit 108 through optical links 124, 126, and 128. Each of the optical links may be implemented using relatively low-cost multi-mode 870 nanometer optical fiber, for example. Such fiber provides immunity to electromagnetic interference, higher bandwidth, greater distance, and lower attenuation 22 gauge shielded twisted pair cabling. In the illustrative embodiment, the central synchronizing management unit incorporates a high quality clock, such as a Cesium clock. The central synchronizing management unit provides timing information, in the form of a clock signal, that may take the form of a DS-1, composite clock or sine wave signal, for example. Additionally, the central synchronizing management unit 100 provides signal status information to the synchronization distribution units 102 and 108. The signal status information may take the form of signals which indicate the validity and/ore origin of the synchronization reference, or clock signal, being transmitted to the synchronization distribution units. Status information will be discussed in greater detail in the discussion related to FIG. 2. Clock sources and related status information are discussed, for example, in "Generic Requirements for Timing Signal Generators", Bellcore GR-378-CORE, and in "Clocks for the Synchronized Network: Common Generic Criteria", Bellcore GR-1244-CORE, which are hereby incorporated by reference.

Although a synchronization distribution system in accordance with the principles of the present invention may be employed as an intra-office synchronization system within a wide variety of telecommunication offices, the system is particularly well-suited for application in synchronized telecommunications systems such as SONET systems or synchronous digital hierarchy (SDH) systems. SONET systems are known and discussed, for example in U.S. Pat. No. 5,682,257 issued to Uchida, which is hereby incorporated by reference in its entirety.

Network elements such as network element 104, 106, 110, etc, may be a digital multiplexor, a digital switch, or a router, for example. Each synchronization distribution unit includes a receiver module that incorporates both active and passive receiver elements, the combination of which permits a daisy-chained interconnection of synchronization distribution units. The daisy-chained interconnection of synchronization distribution units, in turn, provides for the synchronization of hundreds of network elements from a single central synchronizing management unit output. The central synchronizing management unit performs the recovery and processing of the input signal sources, Stratum II holdover protection during dual-input failures, the processing of performance monitor information, and output timing signals with performance monitor information.

Figure 2:
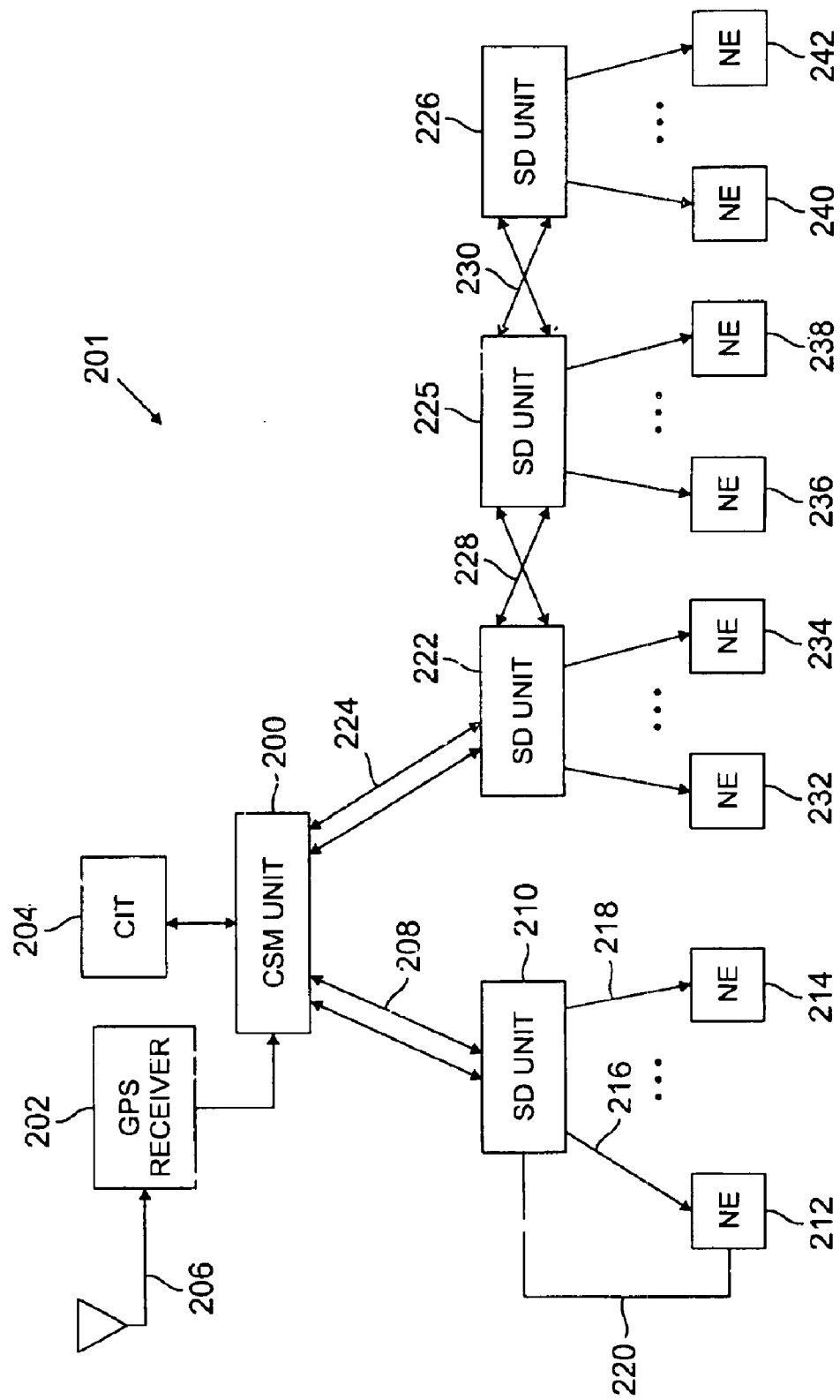
FIG. 2 is a block diagram of a synchronization distribution system in accordance with the principles of the present invention.

Turning now to the conceptual level block diagram of FIG. 2, a synchronization distribution system 201 in accordance with the principles of the present invention is shown in greater detail. A central synchronizing management unit 200 is connected to receive synchronization, or clock, signals from a plurality of clock sources, such as a global positioning system (GPS) receiver 202 and a craft interface terminal (CIT) 204. The GPS receiver is connected to receive its clock signal from an antenna 206. The central synchronizing management unit 200 selects one of the clock sources 202 or 204 as a primary source and the other as a secondary source. Should the primary source fail, the central synchronizing management unit switches to the secondary source to provide clock signals to the remainder of the system 201. In this illustrative embodiment, the central synchronizing management unit 200 may be connected through a redundant bidirectional optical link 208 to a synchronization distribution unit 210. The central synchronizing management unit 200 provides the synchronization distribution unit 210 with synchronization and management information through the link 208. The synchronization distribution unit 210 passes the synchronization information to a plurality of network elements 212, . . . 214, through respective optical links 216, . . . 218. A separate link 220 between one or more network elements and an associated synchronization distribution unit 210 permits a synchronization distribution unit to monitor the performance of each synchronization distribution unit by querying the network element regarding holdover state, fault history, reference switching, for example. The queries may be carried along the optical communication link 216 and reply may be returned along the optical link 220. Queries along the link 216 may be incorporated with clock signals by bridging the clock signal, for example.

Another synchronization distribution unit 222 is connected to the central synchronizing management unit 200 via a redundant bidirectional optical link 224. The synchronization distribution unit 222 is connected in series to synchronization distribution units 225 and 226 through redundant, cross-coupled, optical links 228 and 230 which will be described in greater detail in the discussion related to FIG. 4. Briefly, though, the cross-coupling of the optical links 228 and 230 refers to the fact that each of the synchronization distribution units includes an active and a passive optical link and that the active link of one synchronization distribution unit is routed to the passive link of a downstream synchronization distribution unit and the passive link of an synchronization distribution unit is connected to the active link of a downstream synchronization distribution unit. Each of the synchronization distribution units 222, 225, and 226 respectively supplies synchronization and management signaling to network elements 232 through 234, 236 through 238, and 240 through 242.

Figure 3:
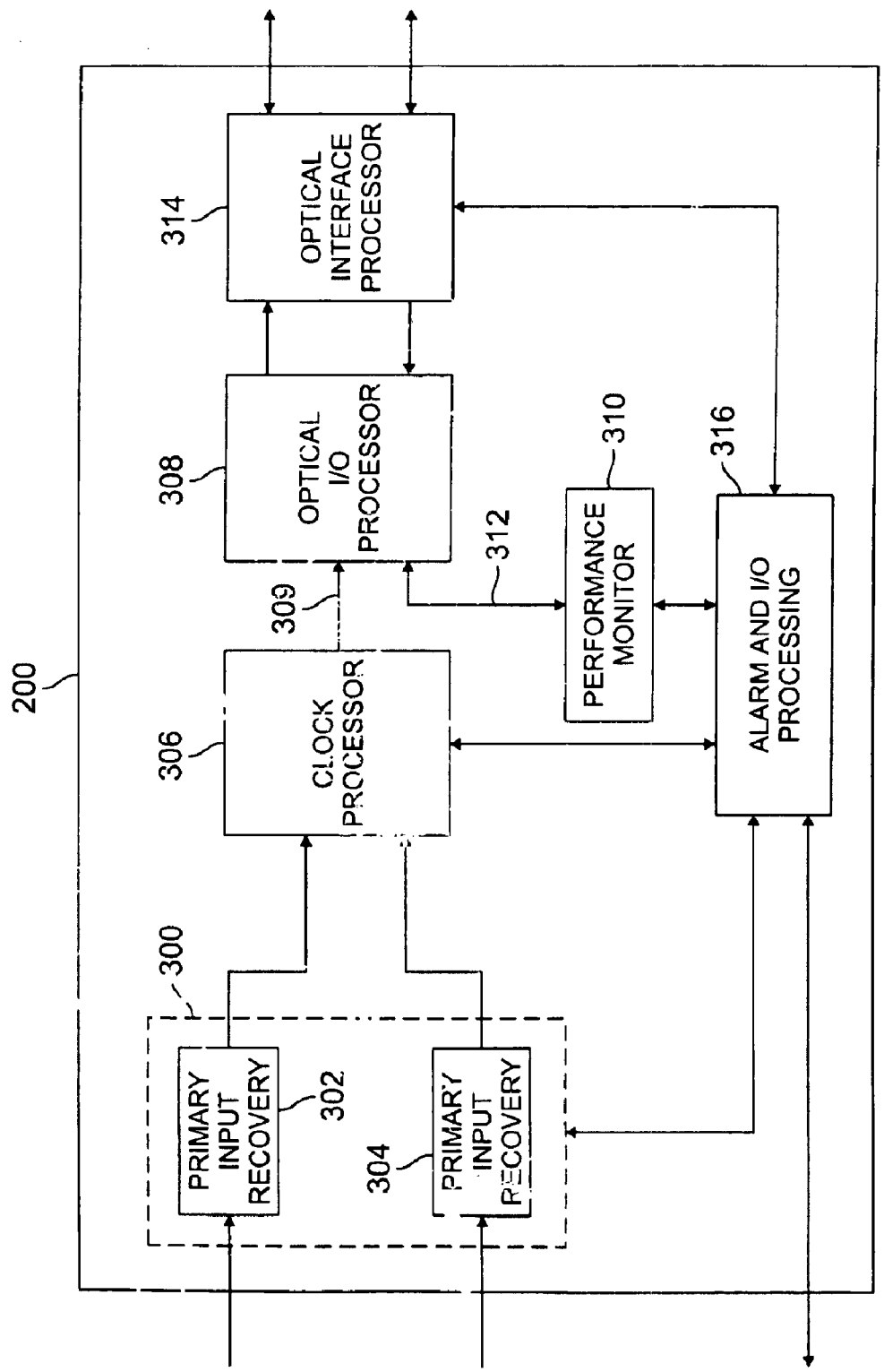
FIG. 3 is a conceptual block diagram of a central synchronizing management unit in accordance with the principles of the present invention.

In general, the central synchronizing management unit 200 provides interfaces for highly stable low error rate clock input signals such as GPS, Stratum I clocks, or other such inputs and provides, for example, Stratum II level output clock signals. The central synchronizing management unit 200 is illustrated in greater detail in the block diagram of FIG. 3. The central synchronizing management unit 200 includes a clock recovery circuit that illustratively receives clock input signals from highly accurate, and stable clock sources, such as the GPS dock source 202 or CIT clock source 204 of FIG. 2. The clock recovery circuit 300 includes primary and secondary input recovery circuits 302 and 304, respectively. In this illustrative embodiment, the clock recovery circuit 302 may be a clock recovery circuit such as may be used in conjunction with a cesium or other highly stable clock source. The clock recovery circuit operates to recover the desired clock signal from the input GPS, CIT, or other signal. That is, the clock recovery circuit 302 performs various known functions, such as demodulation, stripping status and control messages, etc. from the input signals to produce the desired clock reference signal. The clock recovery circuitry also operates to reduce jitter and wander and to maintain the recovered clock signal within the particular frequency and phase error bounds, such as Stratum II error bounds in this illustrative embodiment.

A clock processor 306 receives the recovered clock signals, a primary and a secondary recovered clock signal in this illustrative embodiment, from the clock recovery circuit 300. The clock processor normally selects the primary recovered clock signal to further process and pass along as the synchronization system's clock signal. However, should the clock processor 306 detect a failure, such as a loss of signal, in the primary clock signal, the clock processor 306 switches to the signal from the secondary input recovery circuit 304. The clock processor 306 multiplies the recovered clock signal to a highly stable fixed frequency above 10 MHz before passing it along to an optical input/output processor 308 along electrical signal path 309.

In addition to receiving the recovered clock signal from the clock processor 306, the optical input/output processor exchanges information with a performance monitor system 310 through a bidirectional electrical path 312. Performance monitoring information from the central synchronizing management unit provides downstream synchronized equipment, such as network elements 212 through 214 or network elements 232 through 242 of FIG. 2, with information regarding the integrity of the timing signal received by the central synchronizing management unit 200 from sources such as the GPS source 202 or CIT source 204. This information may take the form of a signature appended to the clock output signal from the central synchronizing management unit, for example. Such performance monitoring information may be used by downstream equipment to prepare for a possible clock failure before the clock failure creates errors, for example.

The performance monitoring signature could incorporate the bit error rate (BER), frequency stability (e.g., Stratum II or III), holdover status, and free-run status of the central synchronizing management unit and could be serially coded with the output clock signal produced by the central synchronizing management unit and supplied to an optical interface system 314. The data rate of the signature could be relatively low, e.g., 100 bits per second. Because of the signature signal's relatively low data rate, such a signal could be readily accommodated by the synchronization system without interference to the clock signal.

The performance monitor 310 may be implemented as either an integral part of the central synchronizing management unit 200 or it could be implemented as an external component. As an external component, the performance monitor could communicate with the optical Input/Output processor 308 and an alarm and Input/Output processing module 316 through a standard interface, such as an RS232 interface. Information from the performance monitor 310 could be employed by the alarm and Input/Output processing module 316 to control such central synchronizing management unit functions as internal reference switching, e.g., between the primary and secondary input recovery modules, remote alarm reporting, and holdover or free-run modes of operation.

In operation, the central synchronizing management unit 200 recovers clock signals from external sources, such as a GPS receiver 202, CIT 204 or other Stratum I traceable clock source. The recovered dock signal is retimed, that is, regenerated with a PLL circuit, for example, to reduce jitter and phase error, with a Stratum 2 or better clock by the clock processor 306. After recovering and retiming the clock signal, the clock signals are converted to optical form by an optical Input/Output processor 308. The optical Input/Output processor 308 provides the optical clock signal to an optical interface signal which distributes the optical clock signal to one or more synchronization distribution units, such as synchronization distribution units 210, 222, 225, and 226 of FIG. 2. The central synchronizing management unit provides a CIT management interface for management and control of the central synchronizing management unit and synchronization distribution units through the alarm and I/O processing module 316. This management and control interface is extended through the optical interface system 314 to every synchronization distribution unit connected to the central synchronizing management unit 200. The alarm and Input/Output processing module 316 also issues local and remote synchronization system alarms to the CIT management interface, indicating, for example the failure of an active optical link within an associated synchronization distribution unit. The central synchronizing management unit may employ conventional LED laser optics and multi-mode optical fiber to distribute clock signals over thousands of feet within a telecommunications office environment.

The central synchronizing management unit provides duplicate active optical outputs to each of its associated synchronization distribution units through its optical interface system 314. In an illustrative embodiment duplicated optical signals may be provided by separate optical components within the central synchronizing management unit, thereby effecting another layer of hardware redundancy.

Additionally, in an illustrative embodiment, the central synchronizing management unit employs wavelength division multiplexing to support an in-band full duplex management channel at each optical distribution port of the optical interface system 314. The central synchronizing management unit is the central operations site for all management functions related to the synchronization domain, such as operations administration monitoring and provisioning (OAM&P) functions. The central synchronizing management unit may query each synchronization distribution unit to obtain various performance statistics. Additionally, the central synchronizing management unit may set performance monitoring thresholds at each of the central synchronizing management unit's associated synchronization distribution units.

The optical interface system 314 may comprise optical output drivers physically located on separate printed circuit cards, with each driver card including several, e.g., ten, parallel outputs. In this embodiment, two separate driver cards are used to service a single output tap. In this way, with their outputs "ORed", a driver card may be removed for maintenance without affecting service. By using a series of passive/active repeater modules, each output may service multiple equipment taps (perhaps as many as ten). If each output driver card is able to provide 100 timing taps, a shelf complement of no more than ten such drivers would be sufficient for most office applications.

Figure 4:
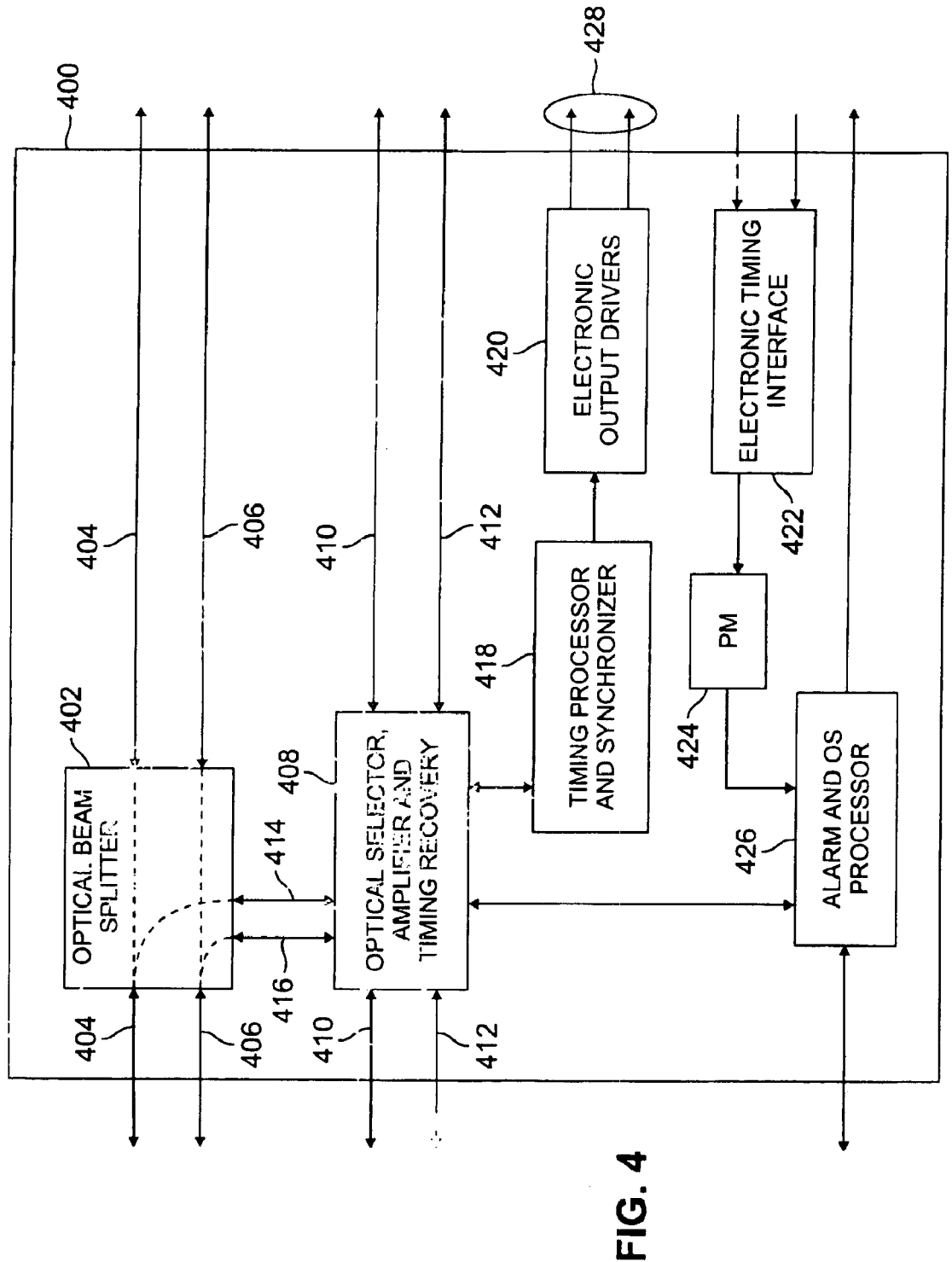
FIG. 4 is a more detailed block diagram of a synchronization distribution system in accordance with the principles of the present invention.

The conceptual block diagram of FIG. 4 illustrates a synchronization distribution unit 400 such as the synchronization distribution unit 102 of FIG. 1 in greater detail. The synchronization distribution unit 400 translates optical clock signals into electronic clock signals such as DS1 E1, composite clock, or analog timing signals, then distributes the electronic clock signals to associated network elements. Additionally, the synchronization distribution unit 400 provides includes both active and passive optical ports for connection to other synchronization distribution units. In the conceptual block diagram of FIG. 4, the synchronization distribution unit 400 includes a passive optical link that comprises an optical beam splitter 402, a primary optical path 404, and a secondary optical path 406. Each optical path provides a bidirectional communications link and, as noted above, upstream and downstream signals may be transmitted simultaneously using wavelength division multiplexing. That is, signals may be sent along the paths 404 and 406 in an upstream direction using an optical signal of one wavelength and in a downstream direction using an optical signal having a different wavelength. The primary path 404 and secondary path 406 may be generated in parallel by a centralized synchronization management system such as central synchronization management unit 200 of FIG. 2 from a selected one of its primary or secondary inputs such as GPS receiver 202 or CIT source 204.

Each synchronization distribution unit 400 also includes an active optical link, including an optical selector, amplifier and timing recovery circuit 408 and primary and secondary optical paths 410 and 412, respectively. The circuit 408 receives primary and secondary timing signals from the optical beam splitter 402 along primary and secondary optical paths 414 and 416. The passive link comprising the optical beam splitter 402 may be connected to receive its primary and secondary optical clock signals from an upstream active link and to send its output to a downstream active link. Similarly, the active optical link, comprising the circuit 408, may be connected to receive its primary and secondary optical clock signals from an upstream passive link and to send its output to a downstream passive link. In this way, should the active link fail, due to a failure of power supplied to the circuit 408, for example, a downstream active link will still receive and operate on both primary and secondary clock signals.

In operation primary and secondary timing signals are received along the primary and secondary optical paths 404 and 406 which, together with the optical beam splitter 402, form the passive optical link. Both signals are split and a portion of the signals proceed along the paths 404 and 406 while another portion is routed along paths 414 and 416 to the circuit 408. The circuit 408 selects among the four input optical signals, i.e., the primary and secondary signals from paths 404 and 406 and the primary and secondary signals from paths 410 and 412, to pass along to a timing processor and synchronizer 418. The timing processor and synchronizer 418 operates to retime the signals, and passes the retimed signals to electronic output drivers 420 which convert the optical signals to electronic signals for distribution to network elements served by the synchronization distribution unit 400. An electronic timing interface circuit 422 receives information in the form of performance monitoring signals, for example, from the network elements served by the synchronization distribution unit 400. This information is passed to a performance monitoring circuit 424 which processes the signals and passes the performance monitoring information along to an alarm and optical selector circuit 426. The alarm and optical selector circuit 426 processes this information and passes it along to the circuit 408 which, based in part on this information, determines which of the clock signals, primary or secondary, is to be used as a clock source for the attached network elements.

The number of electronic output ports 428 can range from 10s to 100s of ports, depending on the application. The electronic timing signals from these ports may be DS1, E1, composite clock, or analog timing signals. Each synchronization distribution unit 400 may have selectable options to generate any of these commonly used signals. In addition to these timing output signals, each synchronization distribution unit 400 may have the ability to monitor parameters such as maximum time interval error (MTIE) and time deviation (TDEV) through the interface 422. In this manner the performance of each of the attached network elements may be monitored and performance information passed along to the central synchronizing management unit serving the synchronization distribution unit 400.

The synchronization distribution units may be implemented as small, inexpensive optical receiver/regenerators located at the equipment to be timed and may be operated from redundant 48 volt office batteries. Physically small synchronization distribution units could be located within the say bay or even the same electrical backplane as the network element or network elements that receives the clock signal. Such an arrangement would further reduce the susceptibility of the synchronization system to electromagnetically induced noise.

In the illustrative embodiment, the alarm and optical system processor 426 decodes status information from the performance monitor 424. The synchronization distribution unit 400 may employ that information to, for example, cut off the output signal at the port 428. The synchronization distribution unit 400 may also send the status information to the attached network element, so that synchronization alarms may be issued by the network element. A passive loop around optical path, which preserves the passive optical path, may be included at the point where an synchronization distribution unit is incorporated into a system in order to permit the outswapping of network elements for maintenance or repair.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A system for providing optical synchronization signals to a telecommunications network comprising:
   a central synchronization management unit for distributing optical synchronization signals, and
   at least one synchronization distribution unit adapted to receive said optical synchronization signals and to distribute the signals to at least one network element, each of said at least one synchronization distribution units including:
      a passive optical input port adapted to receive said optical synchronization signals and to split each received optical synchronization signal into a first optical synchronization signal, which is communicated to an optical output of said synchronization distribution unit, and a second optical synchronization signal to be communicated to an active optical input port of the synchronization distribution unit; and
      said active optical input port configured to receive optical synchronization signals from said passive optical input port and from the output t of a passive optical input port of a previous synchronization distribution unit, if any, and to select one of said received optical synchronization signals to communicate to an included clock recovery system configured to perform clock recovery on said selected optical synchronization signal.

2. The system of claim 1 wherein the clock recovery system is configured to receive optical clock signals from said active optical input port and from said passive optical input port and to perform clock recovery on an optical clock input from a selected one of the active and passive optical input ports.

3. The system of claim 2 wherein the synchronization distribution unit further comprises an alarm and optical system processor for determining which one of signals received from the active and passive optical input ports to perform clock recovery on.

4. The system of claim 3 wherein the synchronization distribution unit further comprises electronic output drivers for converting an optical signal upon which clock recovery has been performed into an electronic clock output signal for provision to a telecommunications network element.

5. The system of claim 2 wherein the synchronization distribution unit includes passive and active optical output ports, the active output port being configured to receive the optical clock signal upon which clock recovery has been performed, the passive optical output port being configured to receive the optical clock signal split at the passive optical input port and routed to an optical output.

6. The system of claim 2 further comprising a second synchronization distribution unit connected in series with the synchronization distribution unit connected to receive synchronization signals from the central synchronization management unit, the second synchronization distribution unit configured to receive synchronization signals from the synchronization distribution unit connected to receive synchronization signals from the central synchronization management unit.

7. The system of claim 6 wherein synchronization distribution units connected in series are cross-coupled, such that the active output of an upstream synchronization distribution unit is coupled to the passive input port of the next downstream synchronization distribution unit in the series and the passive output of the upstream synchronization distribution unit is coupled to the active input port of the next downstream synchronization distribution unit in the series.

8. A method of distributing synchronization signals in a telecommunications office comprising the steps of:
  (a) receiving a plurality of clock signals at a central synchronization management unit and selecting one of said plurality of received clock signals for recovery;
  (b) retiming the selected clock signal and splitting the retimed clock signal into a first clock signal and a second clock signal;
  (c) communication said first clock signal over an optical link to an active input port of a synchronization distribution unit and communicating said second clock signal over an optical link to a passive input port of the synchronization distribution unit;
  (d) selecting said first clock signal or said second clock signal for recovery at the synchronization distribution unit, and
  (e) transmitting the selected clock signal from the synchronization distribution unit to a telecommunications network element.

9. The method of claim 8 further comprising the step of selecting by an synchronization unit of one of the passive and active optical input clock signals to transmit to a network element.

10. The method of claim 8 wherein the selected clock signal is converted from an optical to an electrical signal before transmission to the network element.

11. The method of claim 10 wherein a plurality of synchronization distribution units are connected in series, with the passive output port of an upstream synchronization distribution unit coupled to the active input port of a downstream synchronization distribution unit and the active output port of an upstream synchronization distribution unit coupled to the passive input port of a downstream synchronization distribution unit, each synchronization distribution unit performing clock recovery on the synchronization signal received at its active input port.

12. The system of claim 1 wherein the optical synchronization signals are optical clock signals.

13. The system of claim 1 wherein the central synchronization management unit comprises:
  an input port for receiving clock signals; and
  an optical processor for producing optical clock signals.

14. The system of claim 13 wherein the central synchronization management unit further comprises:
  a processor for retiming and clock signals received at said input port.

15. The system of claim 13 wherein the input port is equipped to receive clock signals from a plurality of clock sources.

16. The system of claim 15 wherein the central synchronization management unit selects one of a plurality of input clock signals as a primary clock output signals.

17. The system of claim 15 wherein the central synchronization management unit procedures a plurality of optical clock output signals.

18. The system of claim 1 wherein a plurality of synchronization distribution units are connected in series, with the passive output port of an upstream synchronization distribution unit coupled to the active input port of a downstream synchronization distribution unit and the active output port of an upstream synchronization distribution unit coupled to the passive input port of a downstream synchronization distribution unit.

* * * * *